Aug. 16, 1960 W. P. FRANKENSTEIN 2,949,219
CARTONS
Filed March 12, 1956 13 Sheets-Sheet 2

INVENTOR.
WILLIAM P. FRANKENSTEIN
BY Joseph A. Rave
Attorney

Aug. 16, 1960 W. P. FRANKENSTEIN 2,949,219
CARTONS

Filed March 12, 1956 13 Sheets-Sheet 4

INVENTOR.
WILLIAM P. FRANKENSTEIN
BY
Joseph A. Rave
Attorney

INVENTOR.
WILLIAM P. FRANKENSTEIN
BY
Joseph A. Pave
Attorney

Aug. 16, 1960 W. P. FRANKENSTEIN 2,949,219
CARTONS
Filed March 12, 1956 13 Sheets-Sheet 6

INVENTOR.
WILLIAM P. FRANKENSTEIN
BY
Joseph A. Rave
Attorney

Aug. 16, 1960 W. P. FRANKENSTEIN 2,949,219
CARTONS
Filed March 12, 1956 13 Sheets-Sheet 7
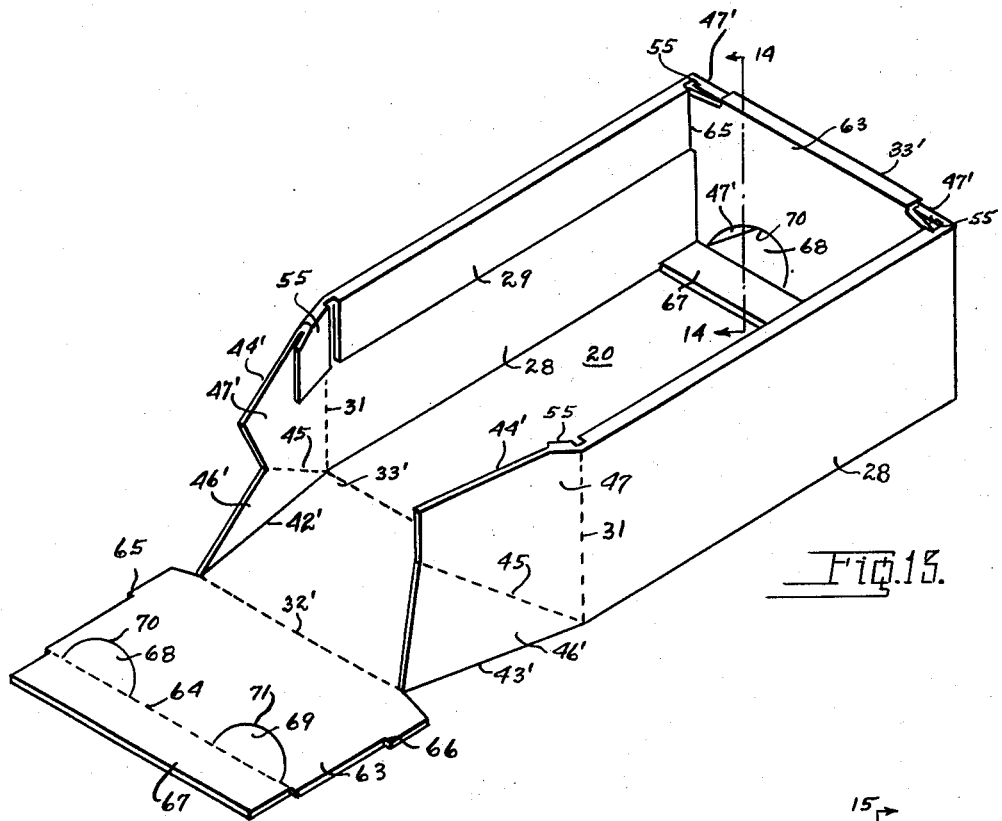
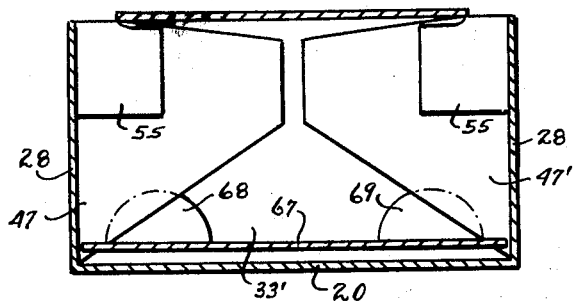
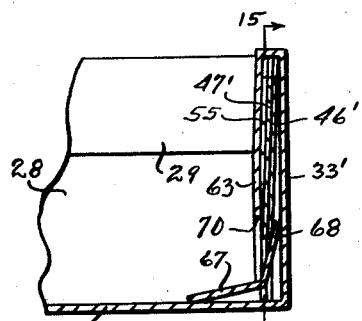
INVENTOR.
WILLIAM P. FRANKENSTEIN
BY
Joseph A. Rave
Attorney Aug. 16, 1960 W. P. FRANKENSTEIN 2,949,219
CARTONS
Filed March 12, 1956 13 Sheets-Sheet 9
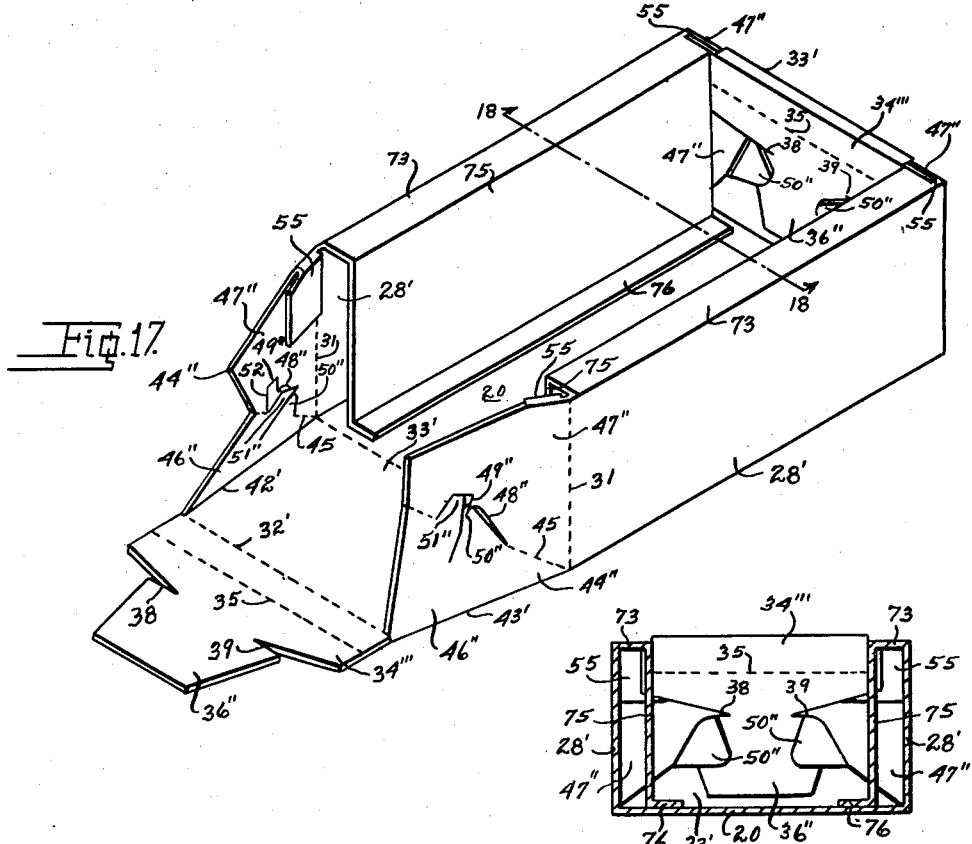
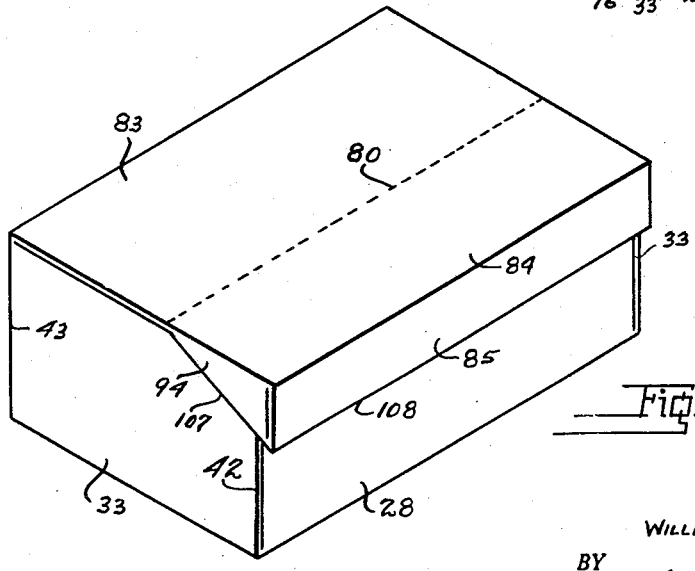
INVENTOR.
WILLIAM P. FRANKENSTEIN
BY
Joseph A. Rave
Attorney Aug. 16, 1960 W. P. FRANKENSTEIN 2,949,219
CARTONS
Filed March 12, 1956 13 Sheets-Sheet 11

INVENTOR.
WILLIAM P. FRANKENSTEIN
BY
Joseph A. Rave
Attorney

Aug. 16, 1960 W. P. FRANKENSTEIN 2,949,219
CARTONS
Filed March 12, 1956 13 Sheets-Sheet 12

INVENTOR.
WILLIAM P. FRANKENSTEIN
BY
Joseph A. Rave
Attorney

INVENTOR.
WILLIAM P. FRANKENSTEIN
BY Joseph A. Rave
Attorney

United States Patent Office 2,949,219
Patented Aug. 16, 1960

2,949,219

CARTONS

William P. Frankenstein, Roselawn, Ohio
(7260 Eastlawn Drive, Cincinnati 37, Ohio)

Filed Mar. 12, 1956, Ser. No. 570,968

11 Claims. (Cl. 229—31)

This invention relates to improvements in boxes or cartons and particularly to improvements in knocked-down boxes and cartons wherein the walls are locked in operative set up positions.

Broadly, boxes or cartons having side and end walls with cooperating means in holding them in operative erected positions are old, but such arrangements may be disturbed upon deflection of a wall adjacent to the locking device thereby rendering such construction at times undesirable.

The present invention discloses means whereby said locking is permanently and positively effected requiring a deliberate release of the locking elements before the carton can be collapsed and thereby providing a carton that is "collapse proof."

The principal object of the present invention is, therefore, the provision of a four-sided box or carton wherein the walls are positively and definitely locked in erected positions.

A further object of this invention is the provision of a box or carton wall locking mechanism wherein adjacent corners of adjacent walls are provided with cooperating locking means for positively engaging a locking element on each of said walls.

A further and specific object of the present invention is the provision of a wall locking lug carried by a wall member of a box or carton for inter-engagement with additional locking lugs associated with said wall and an adjacent wall.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 13 is a perspective view of a partially erected carton from the blank of Fig. 11.

Fig. 14 is a vertical sectional view through an end wall of the carton of Fig. 13 as seen from line 14—14 on said Fig. 13.

Fig. 15 is a vertical sectional view through the end wall of the erected carton of Fig. 13 as seen from line 15—15 on Fig. 14.

Fig. 17 is a perspective view of a partially erected carton from the blank of Fig. 16.

Fig. 18 is a transverse sectional view through the erected carton of Fig. 17 as seen from line 18—18 on said Fig. 17.

Fig. 22 is a perspective view of the erected carton from the blank of Fig. 19 with its lid or cover in a closed position.

Throughout the several views of the drawings similar reference characters are employed to denote the same or similar parts.

Figure 1:
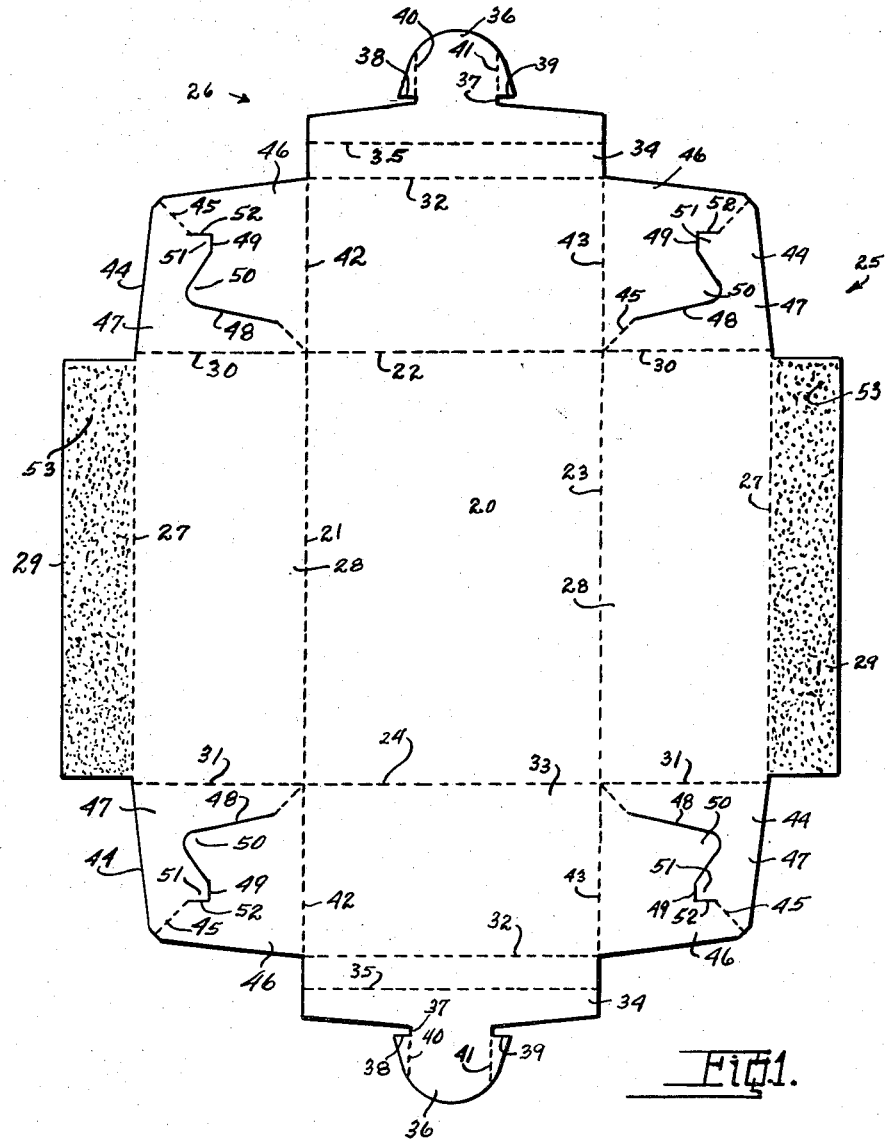
Fig. 1 is an extended plan view of a blank from which a box or carton involving the principles of the present invention may be erected.

As noted above there are several modifications of the basic or underlying inventive thought of the present invention disclosed in the drawings and said modifications will be described in succession insofar as they differ, or are a modification, over the other forms of the invention.

The blank as illustrated in Fig. 1 comprises a central panel 20 having its edges defined by score or fold lines 21, 22, 23 and 24 each of which integrally, hingedly connects with the said panel 20 an extension, which in the erected carton form walls. Specifically, the score or fold lines 21 and 23, which may be designated as the side edges of the panel 20, each integrally, hingedly, connect a similar extension 25 to said panel 20 and which extensions form the box or carton side walls. The score or fold lines 22 and 24, which may be designated as the end edges of the panel 20, each, respectively, integrally, hingedly, connect with said panel 20 similar extensions 26 which in the erected carton form end walls. It should be noted that the designation of said walls as side walls and end walls is merely for descriptive purposes and since the longer walls of boxes or cartons are generally termed side walls while the remaining walls are designated as the end walls.

Each of the side wall extensions 25 is provided with a longitudinal score or fold line 27 for providing the side wall outer wall member 28 and a depending inner wall member or flange 29. The ends of each of the side walls outer wall members 28 is, respectively defined by a score or fold line 30 and 31 which are, in effect, respectively, extensions of the end edges scores 22 and 24 of the panel 20.

Each of the end wall extensions 26 is likewise provided with a longitudinal score or fold line 32 for providing in each of said extensions the end wall outer wall member 33 and the end wall inner wall member 34; for a purpose to be subsequently described each end wall inner wall member 34 is provided with a longitudinally extending score, as at 35. Extended outwardly from each of the end walls inner wall members or panels 34 is a locking tab 36 in the form of, generally, a spear head since it is somewhat narrower than the length of its end wall inner wall member or panel 34. Each locking tab 36 is connected with its panel 34 through a reduced neck-like portion 37 thereby providing on each tab 36 a pair of oppositely projecting shoulders 38 and 39. Further, each tab 36 is provided with score lines 40 and 41 which extend outwardly from its neck 37. Each end wall extension has the ends of its outer wall member or panel 33 respectively defined by score or fold lines 42 and 43 and which score or fold lines are, respectively, extensions of the main panel 20 side score or fold lines 21 and 23.

At each corner of the base or main panel 20 is a similar corner piece, for example, between adjacent side and end walls ends score or fold lines 30 and 43 is a corner piece 44 integrally, hingedly connected with said side and end walls outer wall members through their respective end scores. The said corner piece is provided with a score or fold line 45 which extends outwardly from the corner of the main or bottom panel 20 to the outer edge or corner of the said corner piece. The score or fold line 45, in effect, provides substantially triangular shaped corner piece portions 46 and 47 with the former carried by the end wall outer wall member or panel 33 and the latter carried by the side wall outer member or panel 28. As illustrated in Fig. 1 the corner piece diagonal score or fold line 45 is interrupted by a cut line which may be described, roughly, as a reverse curved line with one portion 48 of said cut line extended into the corner piece portion 47 and the reversed curved portion 49 of said cut line extending into the corner piece portion 46. This results in the corner piece portion 46 having a tongue 50 cut from corner piece portion 47, while said corner piece portion 47 is provided with a tongue 51 cut from the corner piece portion 46. It should be noted that while the portion 49 of the cut line is designated as a reverse "curve" this portion is actually, as illustrated in Fig. 1, a pair of angularly related straight line cuts for providing, as will subsequently be made clear, a shoulder 52 in said corner piece portion 46 on the tongue 51, see Fig. 3.

After the blank of Fig. 1 has been cut and scored as there illustrated and above specifically defined, the side wall inner wall members or panels 29 are each provided with adhesive 53 whereupon they are folded on their respective score or fold lines 27 into face contact with their respective side wall outer wall member or panel 28. It is in this knocked-down position that said carton is shipped to the user for subsequent erection.

Figure 2:
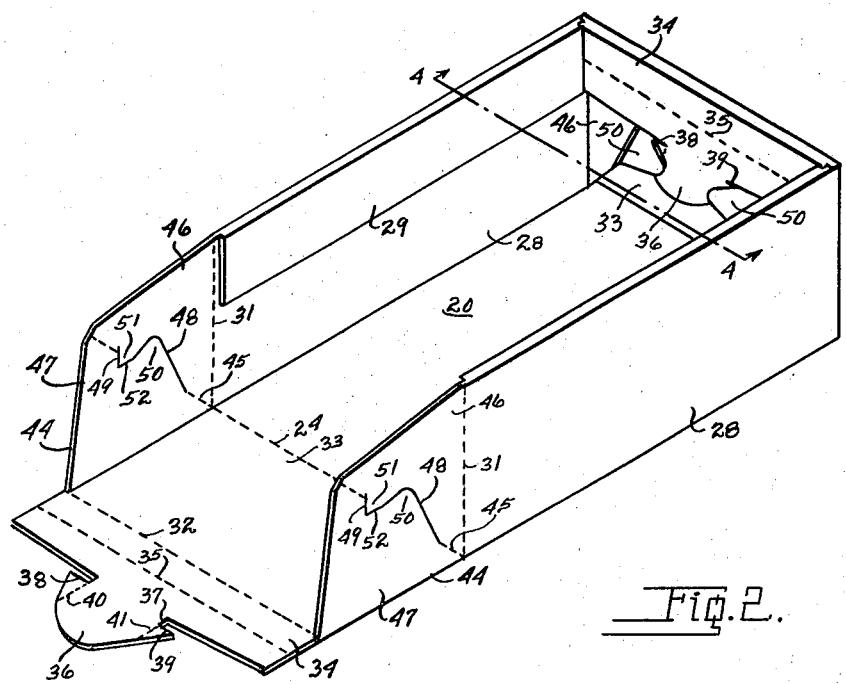
Fig. 2 is a perspective view of a partially erected box or carton from the blank of Fig. 1.
Figure 3:
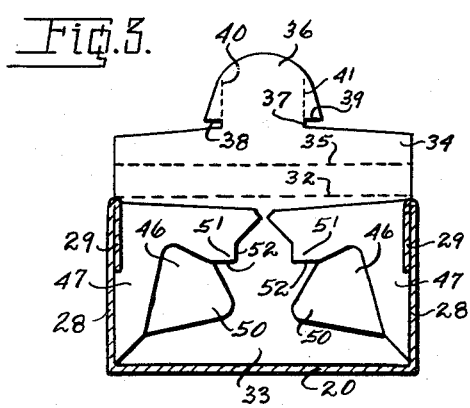
Fig. 3 is a transverse sectional view of a box or carton just before the final step in locking the carton walls in their erected positions.
Figure 4:
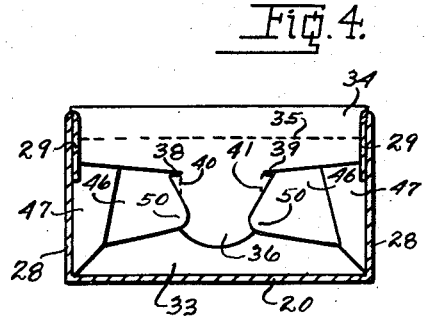
Fig. 4 is a transverse sectional view through the erected carton of Fig. 2 as seen from line 4—4 on said Fig. 2.

The user upon desiring to erect the carton as illustrated in Figs. 2, 3 and 4, for example, does so by first raising the side wall extensions to be upright or normal to the base or bottom panel 20 as clearly illustrated in Fig. 2. With this step the end walls and the corner pieces are as illustrated in the lower or left hand side of Fig. 2.

The said corner pieces are then folded on their respective diagonal fold or score lines 45 thereby raising the end wall extension to be normal to the bottom panel as illustrated in Fig. 3. This folding of the corner pieces results in the tongues 50 and 51 projecting from each corner piece respectively toward one another and with the tongues 50 in the plan of the corner piece 46 which is against the inner face of the end wall outer wall member or panel 43. At the same time the tongues 49 are in the plane of the portion 47 of the corner pieces and therefore in a plane upwardly of the tongues 50. At this time the inner wall member or panel 34 is folded to be interiorly of the box or carton.

The folding of said end wall inner wall member or panel 34 is effected, in effect, by rolling the same on its score or fold line 35 in order to project the outer, and more or less pointed, end of the locking tab 36 beneath the corner pieces tongues 50 while the said main or body portion of the locking tab 36 remains on the upper surface of the corner pieces tongues 51. In order to more readily effect this arrangement of the parts the locking tab 36 may be transversely arched, or arced on its score lines 40 and 41, to more easily project the point of said locking tab beneath the tongues 50. The end wall inner wall member is actuated until it lies against the inner surfaces of the folded corner pieces 44 as clearly illustrated in Fig. 4. At this time the shoulders 38 and 39 of the locking tab 36 are in locking engagement with the shoulders 52 of the corner pieces tongues 51 thereby rendering a positive engagement of the parts which prevents inadvertent release of the carton wall members and all but defies the release of said members by positive action except by positively reversing the steps of carton erection, namely, reversely arching the locking tab 36 to dislodge its locking shoulders 38 and 39 from beneath the cooperating locking shoulders 52 whereupon the said locking tab 36 may be manually withdrawn from beneath the tongues 50 and then only by rolling, upwardly the said end wall inner wall member or panel 34 on its score line 35.

It is to be understood that the said end walls are erected in succession and can be dismantled, likewise, in succession.

The modification illustrated in Figs. 5, 6, 7 and 8 differs essentially in that the corner pieces 44' has the cut line of its diagonal score or fold line 45 reversed from that illustrated in Fig. 1. By this construction the portion 48' of said cut line forms the primary locking tongue 50 from the portion 46' of the corner piece while the portion 49' of said cut line forms the secondary locking tongue 51 from the corner piece portion 47'.

By this construction and upon erection of the carton the said primary locking tongues 50 are in a plane outwardly spaced from the end wall back wall inner surface by the thickness of the material or by the portions 46' of said corner pieces 44. At the same time the secondary locking lugs 51 are in face contact with the said end wall inner wall member or panel 33'.

Figure 5:
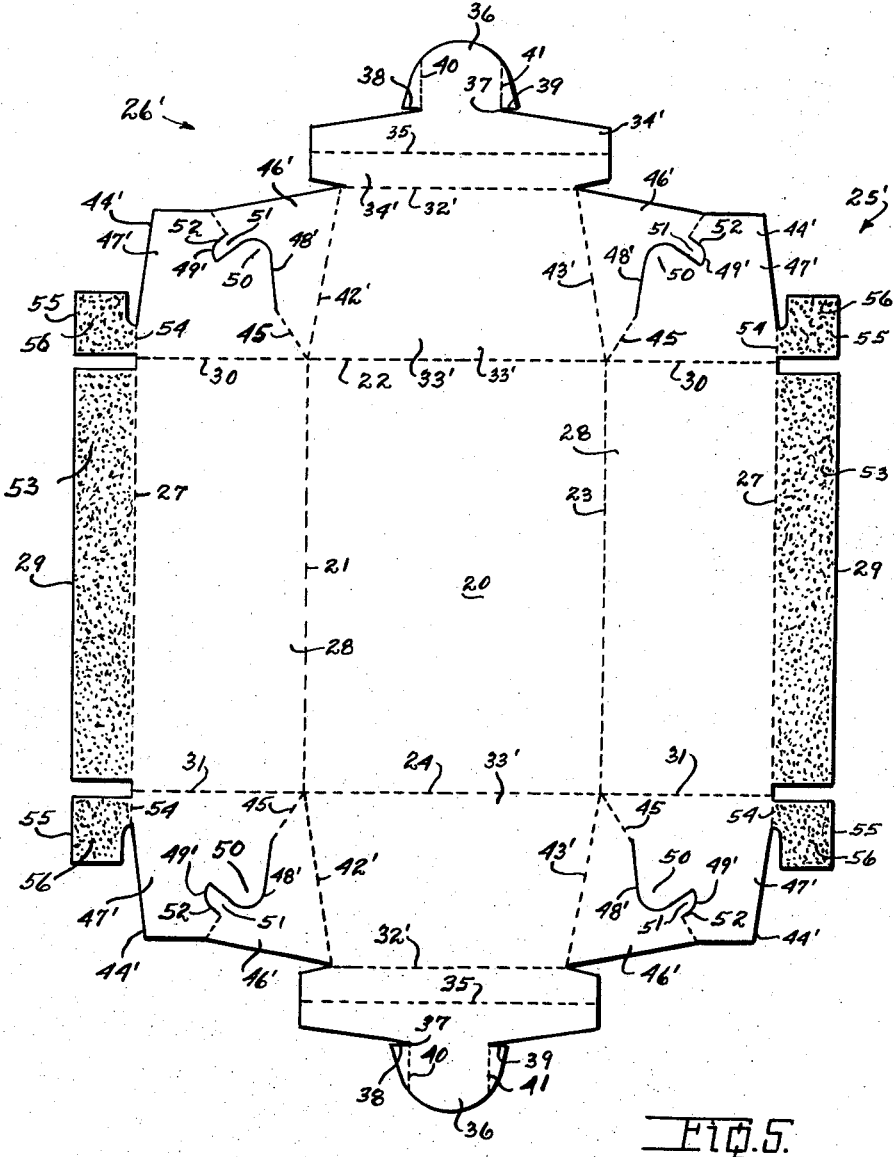
Fig. 5 is a view similar to Fig. 1 of an extended carton blank disclosing a modification over that in said Fig. 1.

In erecting the carton from the modified blank of Fig. 5 there is provided a slight clearance below the primary locking tongues 50 into which the end wall locking lug 36 is inserted. Furthermore the said locking tongues 51 of the modification of Fig. 5 provide the surface on which said locking lug 36 is actuated instead of requiring the deflection of said tongues 51 in order to reach the undersurface of the primary locking lugs 50 as required in the modification of Figs. 1 to 4.

It should be noted that the locking lug arrangement of Fig. 5 may be applied to the structure of Fig. 1 and is not limited to the modified end wall construction of Fig. 5 and which modification will now be described.

In the blank of Fig. 1, the end wall outer wall member or panel 33 is illustrated as having its ends 42 and 43 parallel to one another and to the longitudinal axis of the blank for thereby providing said panel as a rectangle and its ends coincident with the side walls upon erection. In the modification in Fig. 5 the said end wall outer wall member or panel 33' has its ends, or end defining score or fold lines 42' and 43', as converging thereby forming its upper end as determined by score or fold line 32' as of a lesser dimension than its lower end as defined by the score or fold line 22. The end walls inner wall members or panels 34' are however of a length equal to the width of the main or bottom panel 20, and similar to that illustrated in Fig. 1, are each provided with a score 35 on which it is rolled when inserting the locking tab 36 into operative position between the locking tongues 50 and 51.

Figure 6:
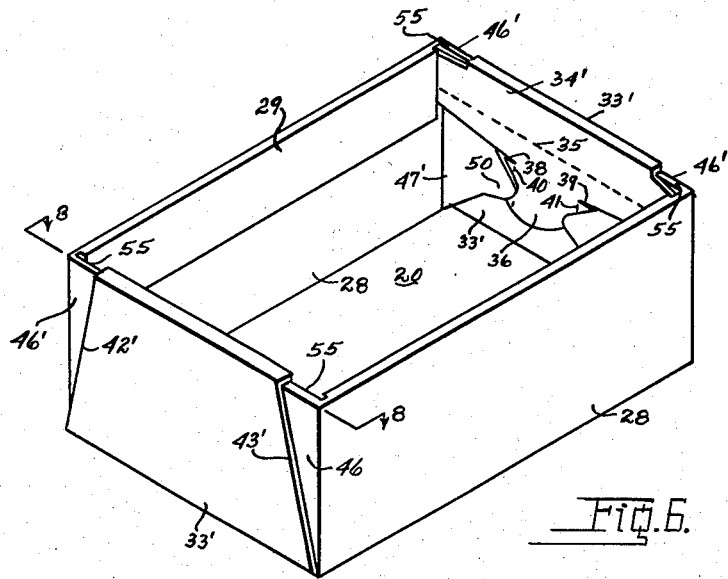
Fig. 6 is a perspective view of an erected carton from the blank of Fig. 5.

This construction results in an end wall formation similar to that illustrated in Fig. 6 and wherein the ends of the end wall outer wall member converge upwardly from the bottom or main panel 20. This construction results in the corner pieces utilizing their portions 47' for completing the end wall structure.

As illustrated in Fig. 5 each corner piece 44' has its outer edge defined, in part, by a score or fold line 54 through which there is integrally hingedly connected with each corner piece a tab 55. The tab 55, after formation of the blank, has applied thereto adhesive 56 through which said tab 55 is attached to its corner piece portion 47' upon the bending or folding thereof on the score or fold line 54.

Figure 7:
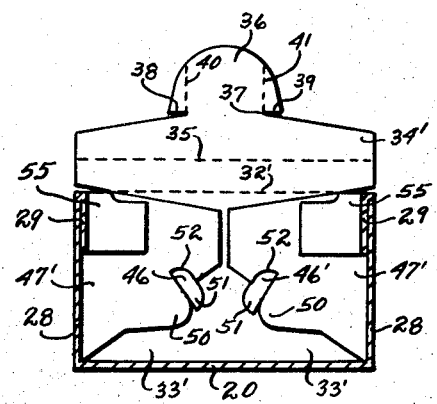
Fig. 7 is a view similar to Fig. 3 disclosing the erected carton just before the final locking stage of the carton walls.
Figure 8:
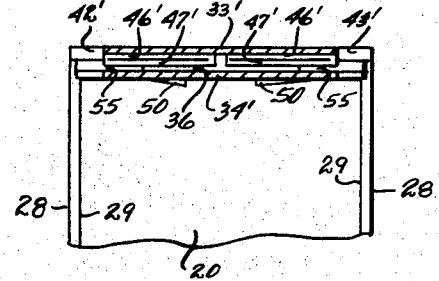
Fig. 8 is a fragmentary view partly in section and partly in elevation of one end of the erected carton of Fig. 6 as seen from line 8—8 on said Fig. 6.

The corner piece tab 55 is located to span that part of the upper edge of the corner piece portion 47' that is located between the upper edge of the end wall outer wall member 33' and the adjacent edge of the side wall as clearly illustrated in Fig. 7. In other words, the flaps 55 are for the purpose of reinforcing and finishing the said upper edge of the corner piece that is exposed after erection of the carton of Fig. 6.

Figure 9:
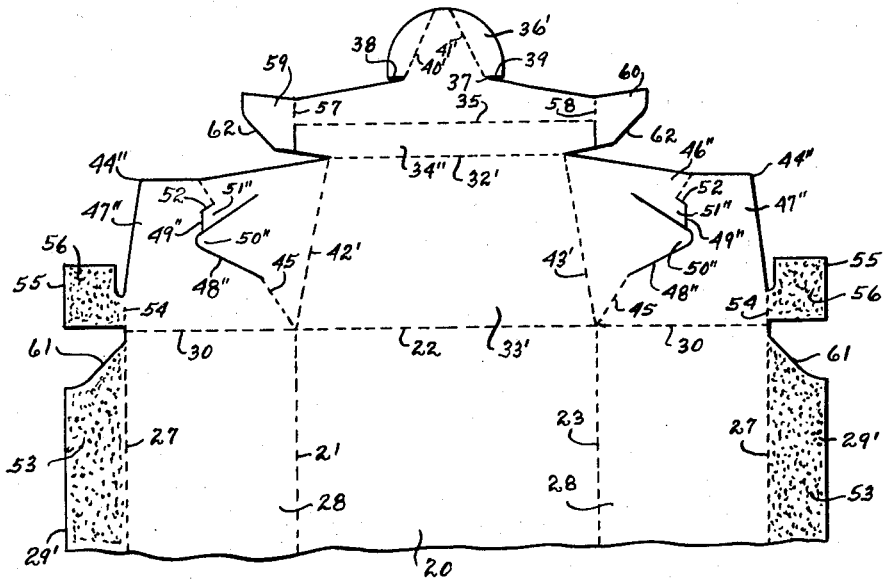
Fig. 9 is an extended plan view of a portion of a blank disclosing modifications therein over that illustrated in Figs. 1 and 5.
Figure 10:
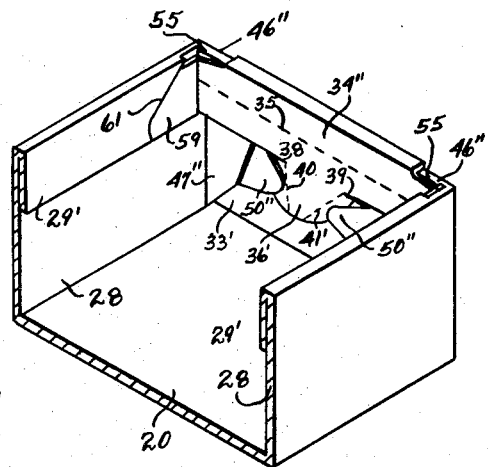
Fig. 10 is a perspective view of the blank portion of Fig. 9 in erected position illustrated with parts in operative positions.
Figure 11:
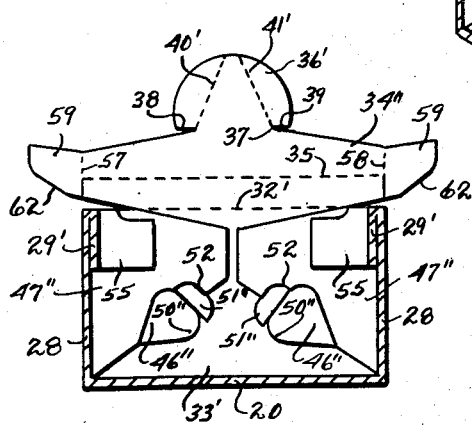
Fig. 11 is a view similar to Figs. 3 and 7 disclosing the modified carton of the blank of Fig. 9 just before the final locking of the walls.

The modification illustrated in Figs. 9, 10 and 11 differ from that in Fig. 5 in that the locking tongues 50 and 51 are each cut or formed from the same corner piece portion, namely, from the corner piece portion 47'' instead of having said locking tongues alternately cut from the portions 46 and 47 of the corner piece.

By this construction the said locking tongues lie against the inner face of the end wall outer wall member or panel 33' and thereby provides a solid sliding surface on the tongues 51 for the insertion thereof below the locking tongues 50.

The modification in Figs. 9, 10 and 11 further discloses the locking tab 36' as provided with scores 40' and 41' which converge on one another instead of being parallel wherefore the said lug 36' may be arched on itself to provide a sharper point for insertion beneath the primary locking tongues 50. It should be noted that the corresponding locking tabs 36 in the modifications of Figs. 1 and 5 may be provided with said diverging score lines instead of parallel score lines without defeating the purpose in either lug.

The said modification in Figs. 9, 10 and 11 further discloses a modified form of locking the parts in erected position which consist in having the ends of each end wall inner wall member or panel 34'' with the portions thereof upwardly of the score or fold line 35 having its ends defined by score or fold lines 57 and 58 and which integrally, hingedly connect with the panel 34'' locking flaps 59 and 60. The locking flaps 59 and 60 are each substantially triangular in plan and each is provided with an inclined locking edge 62.

The side walls inner wall members 29' are likewise modified by having their ends biased or angled as at 61 to correspond with the outer lower, or locking, edge 62 of said flaps 59 and 60.

By this construction, as seen in Fig. 10, the end inner wall member of each end wall is retained in its operative position by having its locking flaps, locking flap 59, being illustrated in Fig. 10, disposed behind the adjacent biased or angled edge 61 of the side wall inner wall member. This construction provides a more positive locking and centering action due to the wedge shape of said locking flaps 59 and 60, than merely having the ends of the end wall inner wall member disposed behind the side walls ends as disclosed in the above identified modification.

Figure 12:
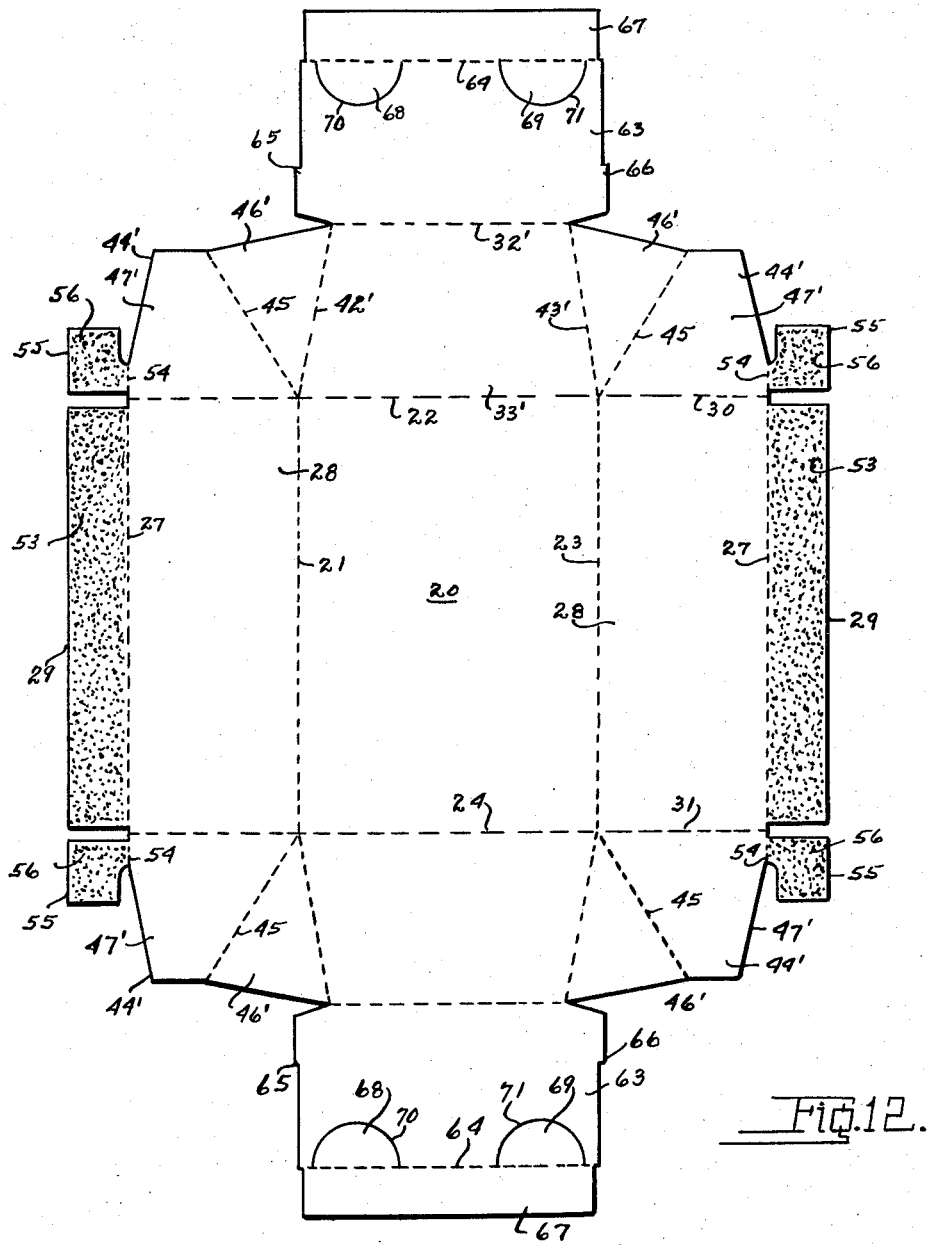
Fig. 12 is a view similar to Figs. 1 and 5 of an extended carton blank disclosing modifications over the said blanks of said Figs. 1 and 5.

The modification illustrated in Figs. 12, 13, 14 and 15 discloses an entirely different walls locking means and includes an end wall inner wall member 63 of substantially the full heighth of the end wall outer wall member 33'. It should be noted that the end wall inner wall member 63 has its outer end, as seen in Fig. 12, formed as a score or fold line 64 and that the heighth of said end wall between its score or fold line 64 and the score or fold line 32 at its upper end, is measurably less than the heighth of the end wall outer wall member or panel 33' as measured between its score or fold line 32 and the score or fold line 22 for a purpose that will be later made clear. The said end wall inner wall member has its two opposite corners outwardly flared to provide locking ears 65 and 66 and has integrally, hingedly connected with its outer end a flap 67. The flap 67 is provided with one or more, herein shown as two, locking lugs 68 and 69 which are cut from the end wall inner wall member 63 by cut lines 70 and 71. The form of the locking lugs 68 and 69 are illustrated as semicircular although this particular form is not controlling.

The modification in Fig. 12 discloses the corner pieces 44' as devoid of any locking lugs since, as will presently be made clear, the said corner pieces themselves cooperate to lock the wall in operative positions. Each corner piece 44' is, however, provided with the diagonal score or fold ilne 45, wherefore said corner pieces are similar to those above described as being folded on themselves bellowswise upon erection of the carton.

The blank of Fig. 12 similar to the blanks of Figs. 1 and 5 has the side walls inner wall members or panels 29 and the flaps 55 each supplied with adhesive for attachment to their respective adjacent members whereupon the knocked-down carton is shipped to the user.

The user erects the carton in the same manner as above set forth, except that the end walls inner wall members are respectively successively folded to be interiorly of the carton with said fold being effected after first disposing the panel 67 normal to said inner wall member. The actuation of the panel 67 rearwardly, or away from the viewer, on the score or fold line 64, as seen in Fig. 12, causes the locking lugs 68 and 69 to be moved forwardly, again as seen in Fig. 12. This construction causes the said locking lugs 68 and 69, during the actuation of the inner wall member 63 on the score or fold line 32, to first engage with the bottom or base panel 20 whereupon the continued movement of the said end wall inner wall member causes the said locking lugs 68 and 69 to slide on the bottom or base panel to and against and upwardly of the end wall outer wall member and be disposed behind the folded corner pieces 47 as illustrated most clearly in Figs. 14 and 15. This operation is rendered relatively simple since, as noted above, the end wall inner wall member 63 is slightly, but measurably, of less heighth than the outer wall member and wherefore upon final assembly the said terminal flap or panel 67 will incline with respect to the carton base or bottom panel 20 and its end wall inner and outer wall members as clearly illustrated in Fig. 14.

Figure 16:
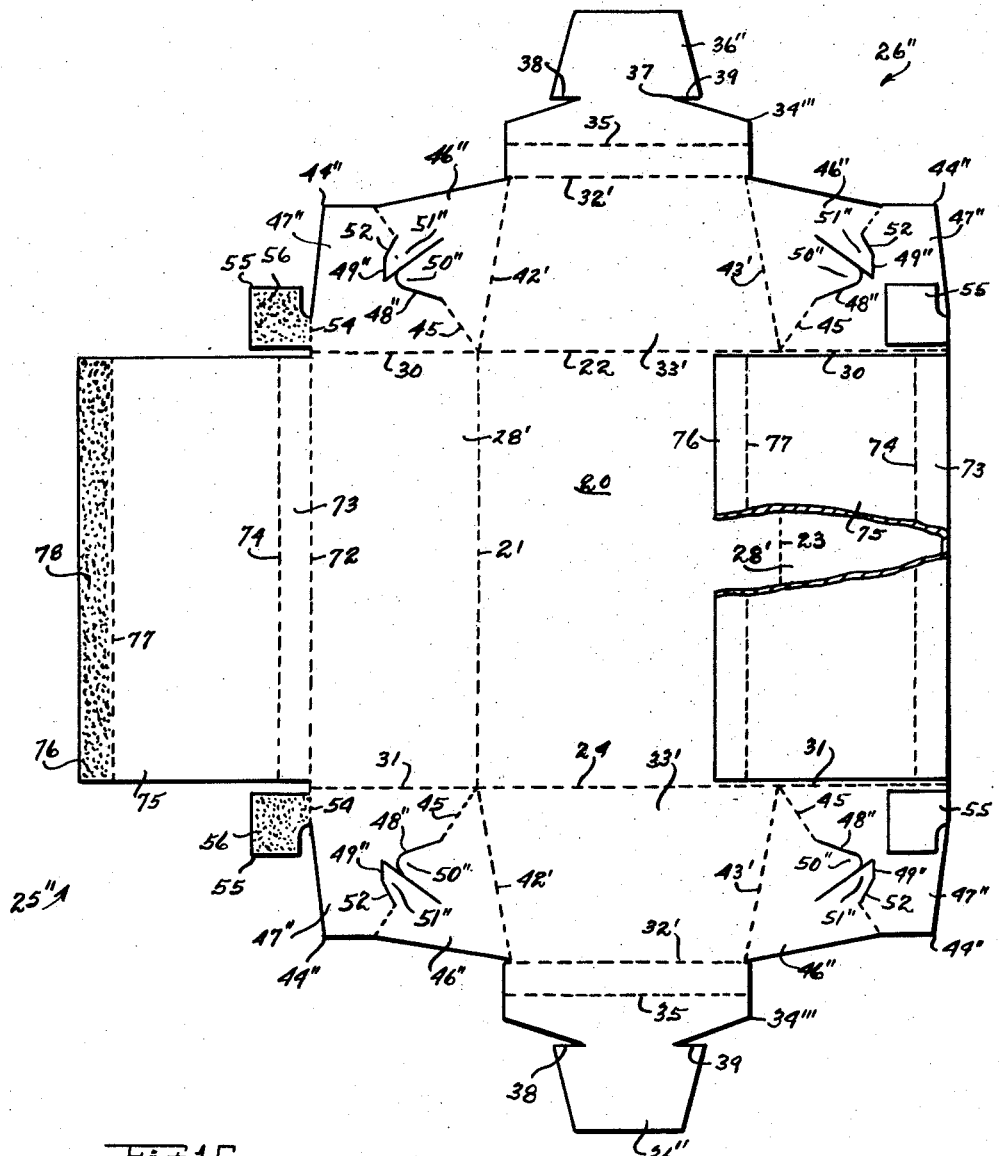
Fig. 16 is a plan view of a blank partly arranged in carton knocked-down position showing a modification of the invention.

The modification illustrated in Figs. 16, 17 and 18 discloses a box or carton wherein the side walls are of hollow construction, that is, each side wall with its inner and outer wall members spaced from one another.

As disclosed in Fig. 16 each of the side walls extensions 25″ has the upper edge of its inner wall member or panel 28′ defined by a score or fold line 72 through which there is integrally, hingedly, connected therewith a panel 73. In the erected carton the panel 73 forms a top or connecting wall member and has its other edge defined by a score or fold line 74 through which there is integrally, hingedly, connected therewith the inner wall member or panel 75. The said inner wall member or panel 75 differs from the inner wall member or panel 29 of Fig. 1 in that the said wall member or panel 75 is of substantially the same heighth as its outer wall member or panel 28′. The said inner wall member or panel 75 has integrally hingedly connected therewith a glue flap 76 effected through a score or fold line 77.

The blank of Fig. 16 after being cut and scored has adhesive 78 applied to the glue flaps 76 of each side wall extension whereupon they are respectively folded on its score or fold line 72 to bring the said glue flaps 76 into adhesive engagement with the base or bottom panel 20 of the blank.

In the blank of Fig. 16 the end walls extensions 26″ each has the inner wall member 34‴ of a length to fit behind the side walls inner wall members 75, upon erection of the carton. For this reason the lateral edges of each of said end walls inner wall members each project slightly beyond the connecting score or fold line 32′, defining the upper end of the end walls outer wall member. It should be noted that the said score or fold line 32′ of each end wall extension is of a length substantially equal to the spacing of the side walls inner wall members and wherefore the upper ends of the end walls outer wall members are each of a length, substantially, equal to the spacing of said side walls inner wall members. Each end wall inner wall member 34‴ has an end wall locking tab 36″ of a modified outline, such as in the form of a keystone or blunt wedge rather than as a spear head as illustrated in the above described modifications.

In practice the knocked-down blank of Fig. 16, as particularly illustrated for the right hand side thereof, is erected in substantially the same manner as above described, for the modifications therein.

The erected carton or box is as illustrated in Figs. 17 and 18 and wherein it will be noted that the side walls are provided with spaced apart inner and outer wall members with each of said wall members hingedly connected to the base or bottom panel and set up into operative positions by merely raising the knocked-down and folded side walls from the extended position of the right hand wall as illustrated in Fig. 16.

The end walls are locked in their erected positions by disposing the locking tab 36″ beneath the corner pieces primary locking tongues 50″.

The modification illustrated in Figs. 19–22, inclusive, is concerned primarily with the addition of a cover or lid, integrally, with the box or carton.

Figure 19:
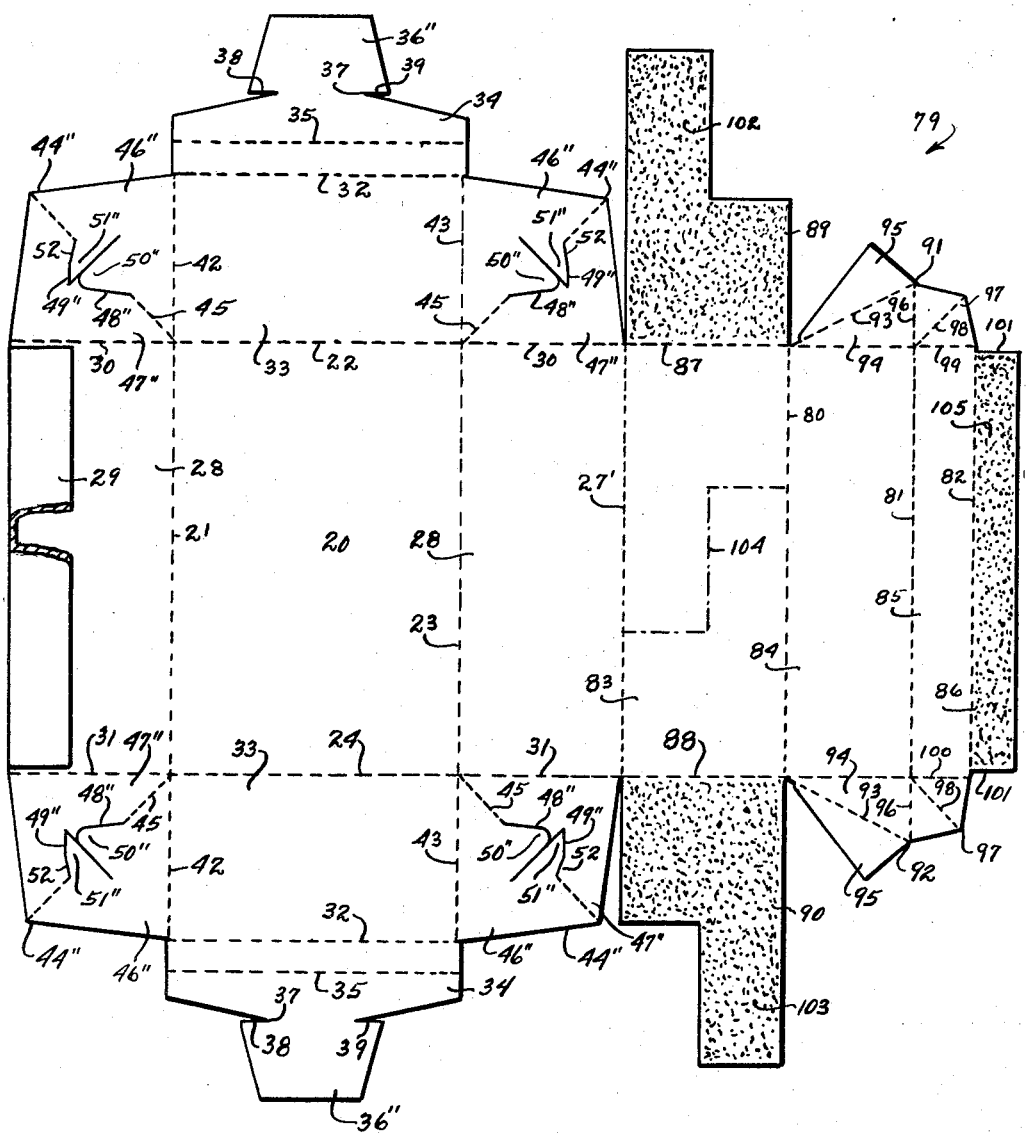
Fig. 19 is an extended plan view of a blank showing additional modifications in a carton embodying the improvements of the present invention.

Specifically and as disclosed in Fig. 19 the blank of Fig. 1 has integrally hingedly connected with the upper edge of one of its side walls outer wall members, the right hand side wall, as seen in Fig. 1, for example, through the score or fold line 27′, an extension 79 provided with a plurality of longitudinally extended parallel fold or score lines 80, 81 and 82, thereby providing in said extension panels 83, 84, 85 and 86. The said extension 79 in the erected carton forms a hinged cover or lid with a depending front flange and of which the panels 83 and 84 together form the cover panel and are therefore together of an area substantially equal to the area of the box or carton within the side and end walls outer wall members.

The said cover panels 83 and 84, respectively, have their side edges defined by score or fold lines 87 and 88 with said cover panel portion 83 having connected thereto, respectively, through its said score or fold lines flap, 89 and 90. The portion 84 of the cover panel has connected thereto, respectively, through its end score or fold lines 87 and 88, flaps 91 and 92 which are, respectively, provided with a diagonal score or fold line 93 for providing substantially identical triangular panel portions 94 and 95 in each flap 92. The triangular flap portion 94s of each of the flaps 91 and 92 has integrally, hingedly connected therewith through a score or fold line 96 a corner piece 97 each provided with a diagonal score or fold line 98 whereby they may be folded on themselves, bellowswise. The said corner pieces 97 are respectively attached to the ends of the panel 85 through end score or fold lines 99 and 100.

The terminal panel 86 of the blank extension 79 is, as seen in Fig. 19 cut slightly smaller in length than its adjacent panel 85 with the end cuts thereof forming shoulders 101 for holding the said lid or cover in erected position, as will presently be made clear.

The flaps 89 and 90 of the cover panel portion 83 are adapted to be folded onto said cover panel portion 83 and secured thereto through adhesive 102 and 103 respectively carried to said panels 89 and 90. The said panels 89 and 90 are illustrated as having their ends irregular, though complementary, whereby they may be interfitted with another to provide a smooth surface with said interfitting ends being illustrated by phantom lines 104.

The blank in Fig. 19 is cut and scored as there shown so that the blank may be printed on one side only, namely, the underside as seen in Fig. 19, and when assembled and erected the said printing is visible. This is obvious from Fig. 20 wherein the erected carton is illustrated with its lid open and wherefore any printing on the said panels 89 and 90 is observable by a prospective purchaser while examining the goods or articles within the box or carton.

In arranging the blank of Fig. 19 as a knocked-down carton the panel 86 is provided with adhesive 105 whereupon it is folded on its score or fold line 82 into face contact with the panel 85. The user in erecting the carton from the knocked-down blank of Fig. 19 sets up the lid or cover by raising in succession, the extensions 91 and 92 and upon the raising of the now adhesively connected panels 85 and 86 folds the corner pieces 97 bellowswise on their diagonal score or fold line 98 and disposes same against the inner surface of the triangular panel or flap portion 94 whereupon the triangular panel or flap portion 95 is folded into face contact with the said panel or triangle flap portion 94 until the outer edge of the said triangle panel or flap portion 95 snaps behind the ends or shoulders 101 of the panels 86, as clearly illustrated in the erected carton of Fig. 20.

Figure 20:
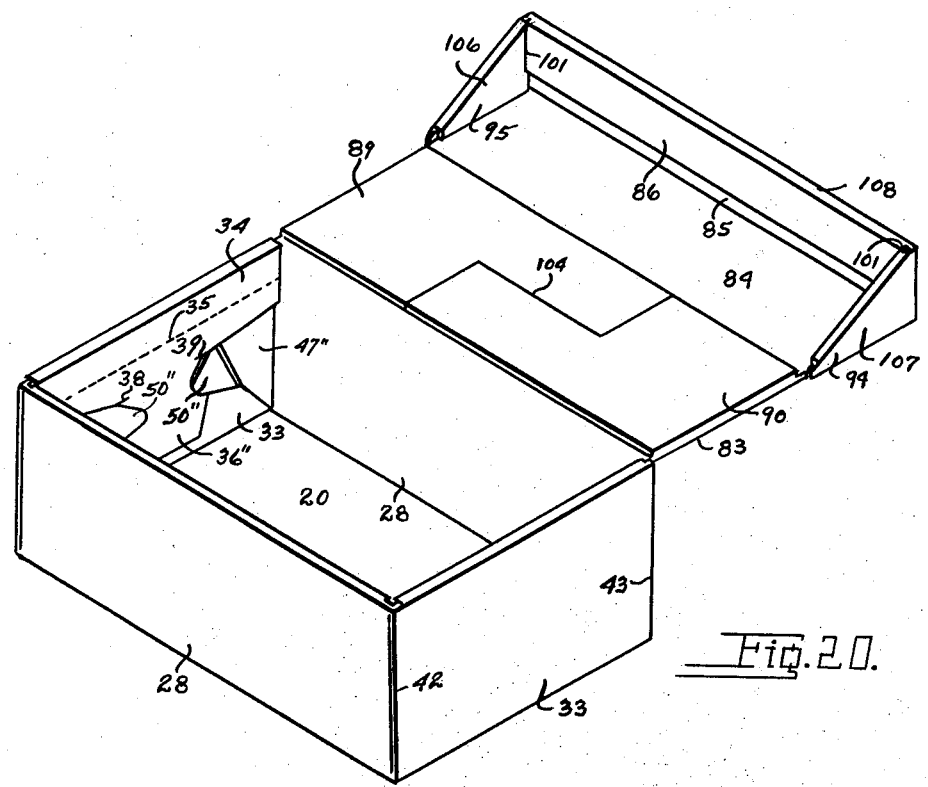
Fig. 20 is a perspective view of an erected carton from the blank of Fig. 19.

The flaps 91 and 92 upon folding provides the cover panel portion 84 with depending side flanges 106 and 107, see Fig. 20, which have their outer edges inclined from the lower edge of the cover front flange 108. The said cover side and front flanges 106, 107 and 108 form an easel support. For this reason the cover or lid is adapted to be folded so that its cover panel portion 83 with its attached flaps 89 and 90 are folded to be exteriorly of the carton side wall outer wall member or panel 28 and which panel or wall member may be designated as the back wall of the box or carton. The cover panel portion 84 may then be folded on the score or fold line 80 to underlie the box or carton for supporting the same with its upper end open as clearly illustrated in Fig. 21.

Figure 21:
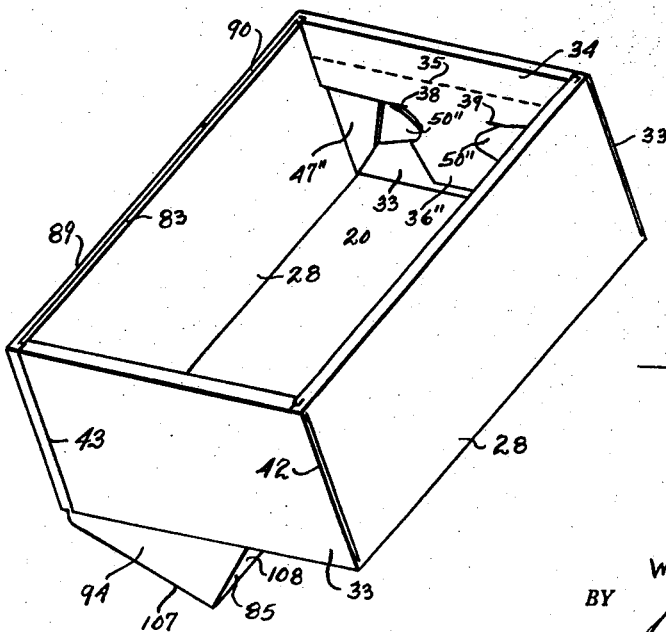
Fig. 21 is a perspective view of the erected blank or carton of Fig. 20 illustrating the same as supported on an easle integral therewith.

Instead of folding the said cover or lid as illustrated in Fig. 21 it may be arranged to close the carton or box open upper end as illustrated in Fig. 22 and with the said side flanges and front flange depending exteriorly of the box or carton ends and front wall.

Figure 23:
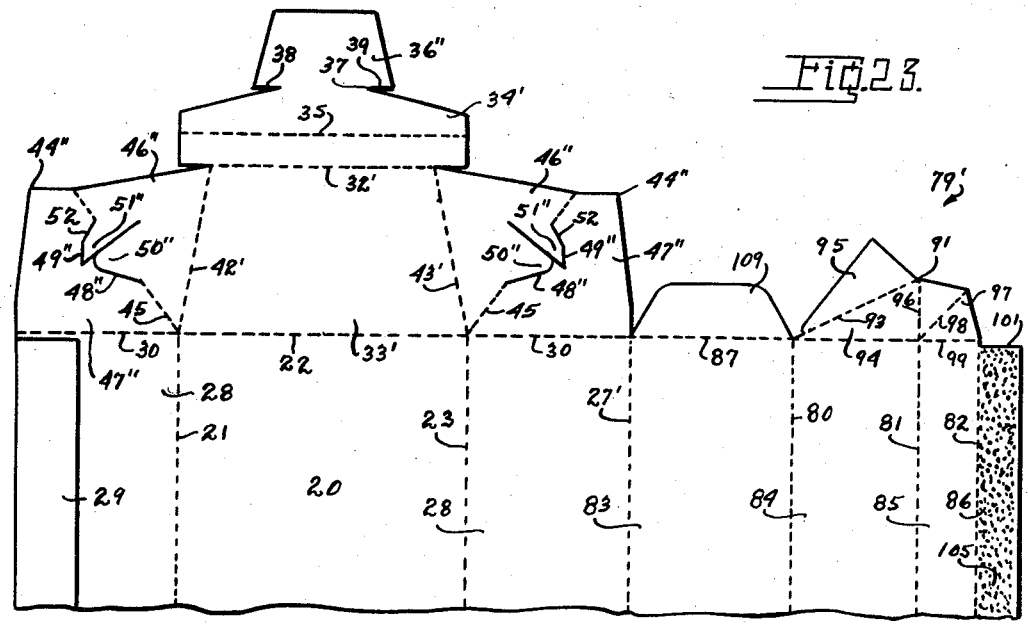
Fig. 23 is a plan view of a partial blank, similar to that disclosed in Fig. 19, but with certain minor modifications.
Figure 24:
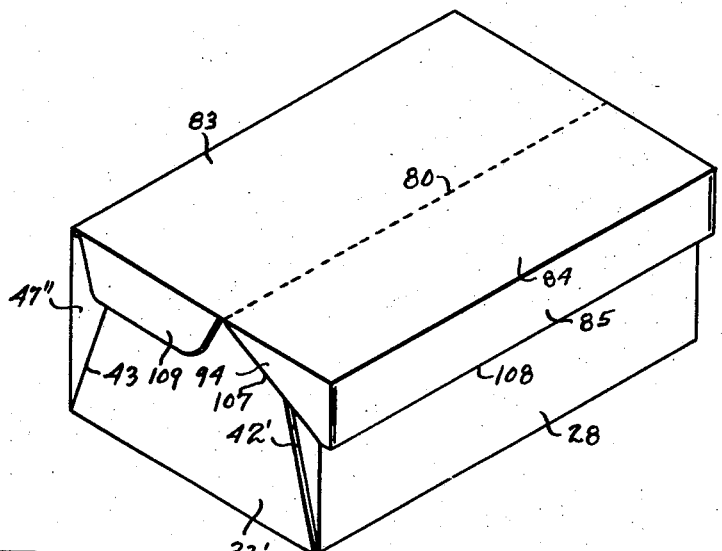
Fig. 24 is a perspective view of a fully erected carton from a complete blank of Fig. 23 with its cover or lid closed.

The modification illustrated in Figs. 23 and 24 is for the same purpose as the modification in Figs. 19 to 22, inclusive, except that it is illustrated as incorporating therein the end wall extension of Fig. 5, more specifically that of Fig. 16, in that use is made of the keystone shaped end wall locking tab 36" instead of the spear head shaped locking tab of Figs. 1 and 5.

A further modification in the blank of Fig. 23 is the substitution of cover or lid side flanges or panels 109 instead of the advertising flaps 89 and 90.

The erected modified carton from a complete blank of Fig. 23 is illustrated in Fig. 24 which discloses the erected end walls and cover with its depending flanges.

Figure 25:
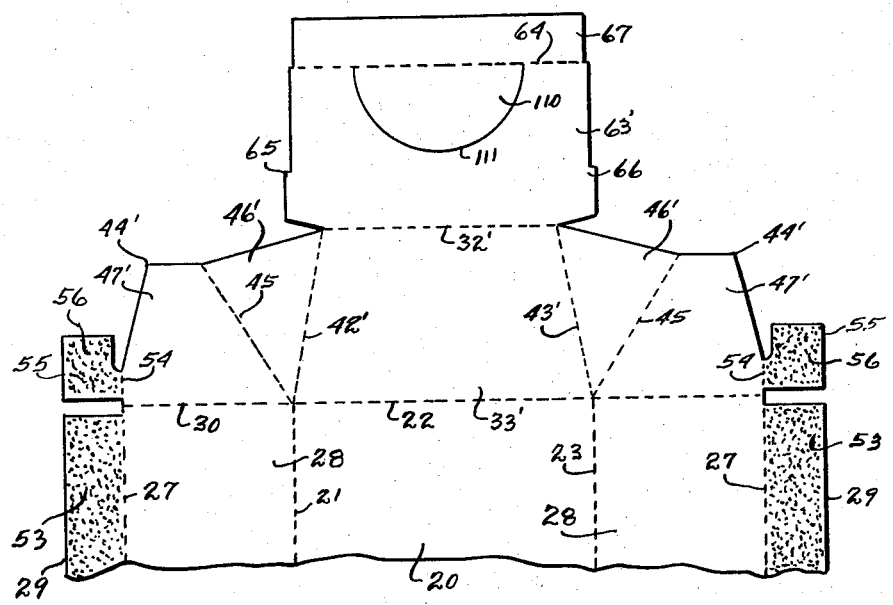
Fig. 25 is a plan view of one end of a symmetrical blank disclosing a modification in the carton of the present invention.
Figure 26:
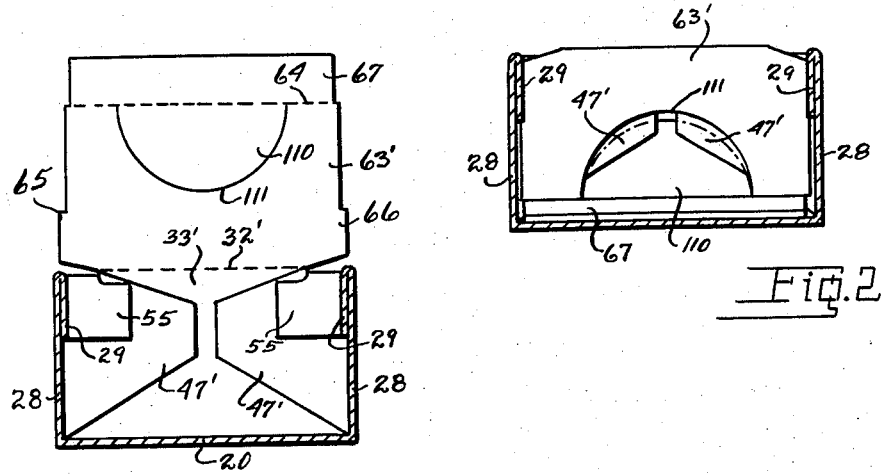
Fig. 26 is a transverse sectional view through a partially erected carton from the blank of Fig. 25 prior to the final erection of the carton, said Fig. 26 being similar to Fig. 3 insofar as the relation of the parts to one another is concerned.
Figure 27:
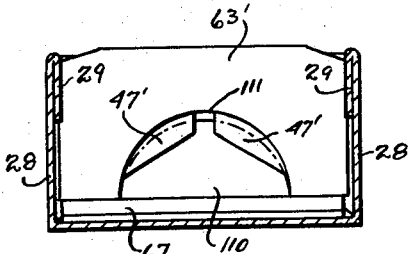
Fig. 27 is a transverse sectional view similar to Fig. 26 of a fully erected carton said Fig. 27 being similar to Fig. 4 insofar as the relationship of the parts are concerned.

The modification illustrated in Figs. 25, 26 and 27 is based on the modification of Figs. 12, 13, 14 and 15, except that the end wall inner wall member 63' is provided with a single locking lug 110 formed therein by a single cut 111, instead of having a pair of locking lugs as illustrated in said Fig. 12.

By this construction the said single locking lug 110 is disposed, simultaneously, beneath each of the folded corner pieces 44' instead of having a single locking lug disposed, independently, beneath each of said corner piece.

By this construction a single insertion of the end wall inner wall member locking lug effects the complete locking of the carton in erected condition instead of requiring the separate locking lug insertions and thereby rendering it slightly easier to lock the carton in its erected position.

I claim:

1. In a box or carton of the class described comprising a rectangular base or bottom panel, side walls upstanding from two opposed edges of said base or bottom panel, end walls including an outer wall member upstanding from each of the remaining two opposed edges of said base or bottom panel, a corner piece hingedly connected with adjacent edges of the side walls and end walls outer wall members with each corner piece having a diagonal fold line forming in each corner piece a pair of triangle portions with said fold line in each corner piece forming the hypotenuse of said triangle portions, each corner piece having therein a pair of lugs formed by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and each said corner piece-tucking flap having its lugs projecting ahead of it and with said lugs of each corner piece-tucking flap vertically arranged one above the other but with the free ends of said lugs stopping short of one another to provide a space therebetween, an inner wall member integrally, hingedly, connected with each end wall outer wall member foldable onto said end wall outer wall member to embrace the transversely disposed corner pieces-tucking flaps, and a locking tab integral with but of less width than and depending from each end wall inner wall member with each locking tab having a free end of less width than the width thereof adjacent the inner wall member and lateral side edges angularly extending upwardly and outwardly from its free end and with each locking tab having its free end below the space between the locking lugs and the angularly extending lateral side edges beneath the lower of the vertically arranged locking lug and above the upper of the vertically arranged locking lug of each of its corner pieces-tucking flaps locking the carton walls in erected positions, and said locking tabs each having a shoulder outwardly of its connection with its inner wall member engaging the said upper arranged locking lugs to prevent inadvertent withdrawal of said locking tabs.

2. In a box or carton of the class described comprising a rectangular base or bottom panel, side walls upstanding from two opposed edges of said base or bottom panel, end walls including an outer wall member upstanding from each of the remaining two opposed edges of said base or bottom panel, a corner piece hingedly connected with adjacent ends of the side walls and end walls outer wall members with each corner piece having a diagonal fold line forming in each corner piece a pair of triangle portions with said fold line in each corner piece forming the hypotenuse of said triangle portions, each corner piece having therein a pair of lugs formed by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and each said corner piece-tucking flap having its lugs projecting ahead of it and with said lugs of each corner piece-tucking flap vertically arranged one above the other but with the free ends of said lugs stopping short of one another to provide a space therebetween, an inner wall member integrally, hingedly, connected with each end wall outer wall member foldable onto said end wall outer wall member to embrace the transversely disposed corner pieces-tucking flaps, and a locking tab integral with but of less width than and depending from each end wall inner wall member with each locking tab having a free end of less width than the width thereof adjacent the inner wall member and lateral side edges angularly extending upwardly and outwardly from its free end and with each locking tab having its free end below the space between the locking lugs and the angularly extending lateral side edges beneath the lower of the vertically arranged locking lug and above the upper of the vertically arranged locking lug of each of its corner pieces-tucking flaps locking the carton walls in erected positions, said locking tabs each having a shoulder outwardly of its connection with its inner wall member engaging said upper arranged locking lugs to prevent inadvertent withdrawal of said locking tabs, and each of said locking tabs inwardly of its angularly extending lateral side edges being provided with a fold line providing on each said locking tab capable of displacement from the plane of the tab to assist in disposing said locking tabs beneath the lower of the said vertically arranged locking lugs of the corner pieces-tucking flaps.

3. In a box or carton the combination of a base or bottom panel rectagular in plan, two opposed side walls upstanding from said base or bottom panel, an end wall including an outer wall member upstanding from each of the two remaining edges of the base or bottom panel with said outer wall member having the lateral end edges thereof converging from said base or bottom panel so that said side walls and the adjacent end wall outer wall member edges diverge from the base or bottom panel, each end wall having an inner wall member integrally, hingedly, connected thereto and of a length substantially equal to the distance and disposed between the carton side walls, a corner piece hingedly connected with adjacent lateral end edges of the side walls and end walls outer wall members with each corner piece having a diagonal fold line forming in each corner piece two portions with said fold line in each corner piece forming a common side of each portion, each corner piece having formed therein a lug formed by cut lines extending from the diagonal fold line thereof, said corner piece each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lug projecting ahead of it but with the free ends of said lugs stopping short of one another, to provide a space therebetween, and a locking tab integral with but of less width than and depending from each end wall inner wall member with each locking tab having a free end of less width than the width thereof adjacent the inner wall member and each locking tab lateral side edges angularly extending upwardly and outwardly from its free end and with each locking tab having its free end below the space between the locking lugs and the angularly extending lateral side edges beneath said locking lugs locking the carton walls in erected positions, said locking tabs each having a shoulder outwardly of its connection with its inner wall member, and means associated with the corner pieces-tucking flaps for impingement on said locking tabs shoulders to prevent inadvertent withdrawal of the locking tabs from beneath the locking lugs.

4. In a box or carton the combination of a base or bottom panel rectangular in plan, two opposed side walls upstanding from said base or bottom panel, an end wall including an outer wall member upstanding from each of the two remaining edges of the base or bottom panel with said outer wall member having the lateral end edges thereof converging from said base or bottom panel so that said side walls and the adjacent end wall outer wall member edges diverge from the base or bottom panel, each end wall having an inner wall member integrally, hingedly, connected thereto and of a length substantially equal to the distance and disposed between the carton side walls, a corner piece hingedly connected with adjacent lateral end edges of the side walls and end walls outer wall members with each corner piece having a diagonal fold line forming in each corner piece two portions with said fold line in each corner piece forming a common side of each portion, a pair of lugs in each corner piece including a lug in each corner piece portion being formed therein by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lugs projecting ahead of it and with said lugs of each corner piece-tucking flap vertically arranged one above the other but with the free ends of said lugs stopping short of one another to provide a space therebetween, and a locking tab integral with but of less width than and depending from each end wall inner wall member with each locking tab having a free end of less width than the width thereof adjacent the inner wall member and each locking tab lateral side edges angularly extending outwardly and upwardly from its free end and with each locking tab having its free end below the space between the locking lugs and the angularly extending lateral side edges beneath said locking lugs locking the carton walls in erected positions.

5. In a box or carton of the class described comprising a rectangular base or bottom panel, side walls upstanding from two opposed edges of said base or bottom panel, an end wall including an outer wall member upstanding from each of the remaining two opposed edges of said base or bottom panel, a corner piece hingedly connected with adjacent ends of the side walls and end walls outer wall members with each corner piece having an upwardly outwardly inclined fold line forming in each corner piece two portions with said fold line forming a similar wall between said portions, a pair of lugs in each corner piece including a lug in each corner piece portion being formed therein by cut-lines extending from the said fold line thereof, said corner pieces each folded on itself on its said fold line and disposed transversely of the base or bottom panel as a tucking flap with said portions of each corner piece-tucking flap disposed in planes parallel with one another and inwardly of but parallel with the plane of the end wall outer wall member and with said corner pieces-tucking flaps at each end of the base or bottom panel extending toward one another and each said corner piece-tucking flap having its lugs projecting ahead of it in the plane of its corner piece portion and vertically arranged one above the other with the free ends of said lugs stopping short of one another to provide a space therebetween, an inner wall member integrally, hingedly, connected with each end wall outer wall member foldable onto said end wall outer wall member to embrace the transversely disposed corner pieces-tucking flaps, and a locking tab integral with but of less width than and depending from each end wall inner wall member with each locking tab having a free end of less width than the width thereof adjacent the inner wall member and each locking tab lateral side edges angularly extending outwardly and upwardly from its free end and with each locking tab having its free end below the space between the locking lugs and its angularly extending lateral side edges beneath the locking lugs in the innermost plane and above the locking lugs in the plane adjacent the end wall outer wall member of each of its corner pieces-tucking flaps locking the carton walls in erected positions.

6. In a box or carton of the class described comprising a rectangular base or bottom panel, side walls upstanding from two opposed edges of said base or bottom panel, an end wall including an outer wall member upstanding from each of the remaining two opposed edges of said base or bottom panel, a corner piece hingedly connected with adjacent ends of the side walls and end walls outer wall members with each corner piece having an upwardly outwardly inclined fold line forming in each corner piece two portions with said fold line forming a similar wall between said portions, a pair of lugs in each corner piece including a lug in each corner piece portion being formed therein by cut-lines extending from the said fold line thereof, said corner pieces each folded on itself on its said fold line and disposed transversely of base or bottom panel as a tucking flap with said portions of each corner piece-tucking flap disposed in planes parallel with one another and inwardly of but parallel with the plane of the end wall outer wall member and with said corner pieces-tucking flaps at each end of the base or bottom panel extending toward one another and each said corner piece-tucking flap having its lugs projecting ahead of it in the plane of its corner piece portion and vertically arranged one above the other with the free ends of said lugs stopping short of one another to provide a space therebetween, an inner wall member integrally, hingedly, connected with each end wall outer wall member foldable onto said end wall outer wall member to embrace the transversely disposed corner pieces-tucking flaps, and a locking tab integral with but of less width than and depending from each end wall inner wall member with each locking tab having a free end of less width than the width thereof adjacent the inner wall member and each locking tab lateral side edges angularly extending outwardly and upwardly from its free end and with each locking tab having its free end below the space between the locking lugs and its angularly extending lateral side edges beneath the locking lugs in the innermost plane and above the locking lugs in the plane adjacent the end wall outer wall member of each of its corner pieces-tucking flaps locking the carton walls in erected positions, and said locking tabs each having a shoulder outwardly of its connection with its inner wall member engaging the said locking lugs in the plane adjacent the end wall outer wall member to prevent inadvertent withdrawal of said locking tabs.

7. In a box or carton the combination of a rectangular base or bottom panel, two opposed side walls upstanding from two opposed edges of said base or bottom panel, each of said side walls including an outer wall member, an inner wall member, a top wall member spacing said inner and outer wall members from one another and a glue flap securing said inner wall member to the base or bottom panel, an end wall upstanding from each of the two remaining edges of the base or bottom panel with each end wall including an outer wall member and an inner wall member, a corner piece hingedly connected with adjacent edges of the side and end walls outer wall members with each corner piece having a diagonal fold line forming in each corner piece a pair of triangular portions with said fold line in each corner piece forming a common side of each portion, each corner piece having formed therein a lug formed by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lug projecting ahead of it but with the free ends of said lugs stopping short of one another to provide a space therebetween, a locking tab integral with but of less width than and depending from each end wall inner wall member with each locking tab having a free end of less width than the width thereof adjacent the inner wall member and each locking tab lateral side edges angularly extending, upwardly and outwardly, from its free end and with each locking tab having its free end below the space between the locking lugs and the angularly extending lateral side edges beneath said locking lugs locking the carton walls in erected positions, said locking tabs each having a shoulder outwardly of its connection with its inner wall member, and means associated with the corner pieces-tucking flaps for impingement on said locking tabs shoulders to prevent inadvertent withdrawal of the locking tabs from beneath the locking lugs.

8. In a box or carton the combination of a rectangular base or bottom panel, two opposed side walls upstanding from two opposed edges of said base or bottom panel, an end wall upstanding from each of the two remaining edges of the base or bottom panel with each end wall including an outer wall and an inner wall member, a corner piece hingedly connected with adjacent edges of the side walls and end walls outer wall members with each corner piece having a diagonal fold line forming in each corner piece a pair of triangular portions with said fold line in each corner piece forming a common side of each portion, each corner piece having formed therein a lug formed by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lug projecting ahead of it but with the free ends of said lugs stopping short of one another to provide a space therebetween, a locking tab integral with but of less width than and depending from each end wall inner wall member with each locking tab having a free end of less width than the width thereof adjacent the inner wall member and each locking tab lateral side edges angularly extending, upwardly and outwardly, from its free end and with each locking tab having its free end below the space between the locking lugs and the angularly extending lateral side edges beneath said locking lugs locking the carton walls in erected positions, said locking tabs each having a shoulder outwardly of its connection with its inner wall member, means associated with the corner pieces-tucking flaps for impingement on said locking tabs shoulders to prevent inadvertent withdrawal of the locking tabs from beneath the locking lugs, and a cover integrally, hingedly, connected with the upper edge of one of said side walls.

9. In a box or carton the combination of a rectangular base or bottom panel, two opposed side walls upstanding from two opposed edges of said base or bottom panel, an end wall upstanding from each of the two remaining edges of the base or bottom panel with each end wall including an outer wall and an inner wall member, a corner piece hingedly connected with adjacent edges of the side walls and end walls outer wall members with each corner piece having a diagonal fold line forming in each corner piece a pair of triangular portions with said fold line in each corner piece forming a common side of each portion, each corner piece having formed therein a lug formed by cut lines extending from the diagonal fold line thereof, said corner piece each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lug projecting ahead of it but with the free ends of said lugs stopping short of one another to provide a space therebetween, a locking tab integral with but of less width than and depending from each end wall inner wall member with each locking tab having a free end of less width than the width thereof adjacent the inner wall member and each locking tab lateral side edges angularly extending, upwardly and outwardly, from its free end and with each locking tab having its free end below the space between the locking lugs and the angularly extending lateral side edges beneath said locking lugs locking the carton walls in erected positions, said locking tabs each having a shoulder outwardly of its connection with its inner wall member, means associated with the corner pieces-tucking flaps for impingement on said locking tabs shoulders to prevent inadvertent withdrawal of the locking tabs from beneath the locking lugs, a cover integrally, hingedly connected with the upper edge of one of said side walls, comprising a cover panel of an area substantially equal to the area of the box or carton and having a front edge and two opposed side edges, and a reinforcing panel integrally, hingedly, connected with each cover side edge folded onto and secured to the cover panel, and said cover panel having a score line transversely thereof at the edges of said cover panel reinforcing panels remote from the hinge connection of the cover and side wall so that said cover may be folded to be beneath the carton base or bottom panel.

10. In a box or carton the combination of a base or bottom panel rectangular in plan, two opposed side walls upstanding from said base or bottom panel each including an outer wall and an inner wall member, each side wall inner wall member having its upper outer corner biased downwardly and inwardly, an end wall upstanding from each of the two remaining edges of the base or bottom panel each including an inner and an outer wall member, a corner piece hingedly connected with adjacent edges of the side walls and end walls outer wall members with each corner piece having a diagonal fold line forming in each corner piece a pair of triangular portions with said fold line in each corner piece forming a common side of each portion, each corner piece having formed therein a lug formed by cut lines extending from the diagonal fold line thereof, said corner pieces each folded on itself on its diagonal fold line and disposed transversely of the base or bottom panel as a tucking flap and with said corner piece-tucking flaps at each end of the base or bottom panel extending toward one another and enfolded by its end wall inner and outer wall members, each said corner piece-tucking flap having its lug projecting ahead of it but with the free ends of said lugs stopping short of one another to provide a space therebetween, a locking tab integral with but of less width than and depending from each end wall inner wall member with each locking tab having a free end of less width than the width thereof adjacent the inner wall member and each locking tab lateral side edges angularly extending, upwardly and outwardly, from its free end and with each locking tab having its free end below the space between the locking lugs and the angularly extending lateral side edges beneath said locking lugs locking the carton walls in erected position, said locking tabs each having a shoulder outwardly of its connection with its inner wall member, means associated with the corner pieces-tucking flaps for impingement on said locking tabs shoulders to prevent inadvertent withdrawal of the locking tabs from beneath the locking lugs, and a substantially triangularly shaped locking wing integrally, hingedly carried by each end wall inner wall member at the lateral ends thereof for engagement behind the biased corners of the side walls inner wall members.

11. In a box or carton the combination of a rectangular base or bottom panel, two opposed side walls upstanding from two opposed edges of said base or bottom panel, an end wall upstanding from each of the two remaining edges of the base or bottom panel with each end wall including an outer wall and an inner wall member, a corner piece hingedly connected with adjacent edges of the side walls and end walls outer wall members with each corner piece having a diagonal fold line forming in each corner piece a pair of triangular portions with said fold line in each corner piece forming a common side of each portion, each corner piece having formed therein a lug formed by cut lines extending from the diagonal fold line thereof, said corner pieces each folded on itself on its diagonal fold line and disposed transversely of the base or bottom panel as a tucking flap and with said corner pieces-tucking flaps at each end of the base or bottom panel extending toward one another and enfolded by its end wall inner and outer wall members, each said corner piece-tucking flap having its lug projecting ahead of it but with the free ends of said lug stopping short of one another to provide a space therebetween, a locking tab integral with but of less width than and depending from each end wall inner wall member with each locking tab having a free end of less width than the width thereof adjacent the inner wall member and each locking tab lateral side edges angularly extending, upwardly and outwardly, from its free end and with each locking tab having its free end below the space between the locking lugs and the angularly extending lateral side edges beneath said locking lugs locking the carton walls in erected positions, said locking tabs each having a shoulder outwardly of its connection with its inner wall member, means associated with the corner pieces-tucking flaps for impingement on said locking tabs shoulders to prevent inadvertent withdrawal of the locking tabs from beneath the locking lugs, and a cover integrally, hingedly connected with the upper edge of one of said side walls, and said cover having a transverse score outwardly of its hinge connection with said side wall so that the cover may be folded beneath the carton base or bottom panel.

References Cited in the file of this patent
UNITED STATES PATENTS

| | | |
|---|---|---|
| 716,665 | Burton | Dec. 23, 1902 |
| 802,916 | Crompton | Oct. 24, 1905 |
| 850,345 | Conover | Apr. 16, 1907 |
| 931,373 | Bachmann | Aug. 17, 1909 |
| 1,083,048 | Bachmann | Dec. 30, 1913 |
| 1,189,452 | Ives | July 4, 1916 |
| 1,699,269 | Bachmann | Jan. 15, 1929 |
| 2,206,304 | Ringler | July 2, 1940 |
| 2,220,121 | Ringler | Nov. 5, 1940 |
| 2,231,515 | Vogt | Feb. 11, 1941 |
| 2,251,627 | Johnson | Aug. 5, 1941 |
| 2,398,155 | Platt | Apr. 9, 1946 |